United States Patent [19]

Nagata et al.

[11] Patent Number: 5,665,407
[45] Date of Patent: Sep. 9, 1997

[54] PROCESS FOR THE PRODUCTION OF LIGHT-COLORED SEASONING LIQUORS

[75] Inventors: Sadao Nagata; Shigeru Endo, both of Ohimachi; Keiichi Kishi, Tokyo, all of Japan

[73] Assignee: Nisshin Flour Milling Co., Ltd., Tokyo, Japan

[21] Appl. No.: 540,828

[22] Filed: Oct. 11, 1995

[30] Foreign Application Priority Data

Oct. 28, 1994 [JP] Japan ................................. 6-264754

[51] Int. Cl.⁶ ........................... A23L 1/105; A23L 1/20
[52] U.S. Cl. .................... 426/18; 426/46; 426/60
[58] Field of Search ........................... 426/18, 44, 61, 426/589, 46, 49, 60

[56] References Cited

U.S. PATENT DOCUMENTS

| | | | |
|---|---|---|---|
| 4,180,599 | 12/1979 | Kazuo | 426/18 |
| 5,352,464 | 10/1994 | Kotegawa | 426/18 |
| 5,523,100 | 6/1996 | Teh | 426/46 |

FOREIGN PATENT DOCUMENTS 57-48188  10/1982  Japan .

OTHER PUBLICATIONS

Database FSTA, International Food Information Service, AN—2260, Abstract of Korean Journal of Applied Microbiology and Bioengineering, 1974, J.M. Lee, et al., "The Substitution Of Raw Material For Soy Sauce. IV. Use Of Wheat Gluten".

Database WPI, Derwent Publications Ltd., AN–73–81331U, JP–48–043636.

Database WPI, Derwent Publications Ltd., AN–76–37039X, JP–51–038496, Apr. 1, 1976.

*Primary Examiner*—Arthur L. Corbin
*Attorney, Agent, or Firm*—Oblon, Spivak, McClelland, Maier & Neustadt, P.C.

[57] ABSTRACT

A process for the production of a light-colored seasoning liquor, which comprises forming a koji-making and fermenting material from a blend material of (A) 90-70% by weight of a material consisting of 25-100% by weight of gluten and 75-0% by weight of wheat and (B) 10-30% by weight of soybeans, and then carrying out subsequent koji-making and fermentation steps by a conventional method to form a fermented koji product, which is then squeezed to obtain the seasoning liquor.

8 Claims, No Drawings

PROCESS FOR THE PRODUCTION OF LIGHT-COLORED SEASONING LIQUORS

FIELD OF THE INVENTION

This invention relates to a process for the production of a seasoning liquor and more particularly, to a process for manufacturing a seasoning liquor having a light color, a slow browning rate, an excellent flavor, a good body and a good taste.

BACKGROUND OF THE INVENTION

In general, a light-colored soy sauce, a so-called usukuchi shoyu was prepared using wheat as a starchy raw material and soybeans as a protein raw material. In the process, the starchy raw material was charged in somewhat larger amount or a common salt was charged with higher salt concentration to inhibit coloration. As a result, the prior usukuchi shoyu felt rather salty than tasty.

Further, the prior usukuchi shoyu has a very rapid browning rate, is unstable and also has an unsatisfactory flavor due to the processes employing a shortened fermenting and decoloration of the resultant soy sauce to obtain a light color.

For manufacture of a light-colored soy sauce having a slow browning rate, it is suggested in Japanese Patent Publication No. Sho 57-48188 that at least one of starchy materials from corn, sorghum and millet is used in combination with 10–30% by weight of gluten.

However, this process has the problems that (i) a peculiar flavor derived from wheat cannot be felt, since other starchy materials than wheat are used, (ii) corn, sorghum or millet has a less glutamic acid content, then a glutamic acid content in soy sauce becomes less and as a result, a poor taste is given, and (iii) soy sauce is not so much light-colored.

DETAILED DESCRIPTION OF THE INVENTION

In view of such circumstances, the present inventors have made extensive studies in an effort to solve the above problems and to provide a seasoning liquor having a light color of JAS Color Number of No. 35 or more, a slow browning rate, an excellent flavor, a good body and a good taste. As a result, the present inventors were successful in the production of the improved, light-colored seasoning liquors by using as a raw material for koji-making and fermentation a mixture of soybeans blended with gluten in specified proportions or a mixture of soybeans blended with a mixture of gluten and wheat in specified proportions.

According to the present invention, there is provided a process for the production of a light-colored seasoning liquor, which comprises using as a koji-making and fermenting material, a blend material of (A) 90-70% by weight of a material consisting of 25–100% by weight of gluten and 75-0% by weight of wheat and (B) 10–30% by weight of soybeans, and then carrying out a subsequent koji-making and fermentation by a conventional method, all percentages by weight being on a dry basis.

The term "light color" as used herein refers to a color of JAS Color Number of No. 35 or more.

The wheat used in this invention may be either wheat grain or wheat flour. In particular, the milled wheat grain from which bran coat is removed is preferable.

The gluten used in this invention includes wheat gluten, corn gluten and the like. Particularly preferable is wheat gluten. Either wet gluten or dried gluten obtained by drying the wet gluten may be employed and dried gluten is particularly preferable. The dried gluten includes vital gluten powder, dry gluten and the like.

Wet gluten containing a sufficient amount of water has a strongly sticky, gum property. In particular, the vital gluten powder hardly undergoes a thermal denaturation, so that this powder will exert the above property remarkably when water is added. Even dry gluten in the pored sheet shape, having insufficient thermal denaturation, will exert a considerable level of stickiness when water is added. In this situation, adding water to the dried gluten or adding the dried gluten to a water-added, defatted soybean, followed by steaming will result in the formation of a completely massive block which cannot be disintegrated at all by a disintegrator due to its viscoelasticity. When such massive block is applied for koji-making with other materials, it will form a larger mass which may cause easily putrefaction of koji.

In the process, it is required that the material (A) such as the gluten or the mixture of gluten and wheat is thermally treated to denature protein therein sufficiently. For the thermal treatment, one may desirably use a process which includes adding steam directly to the material (A) without addition of water to adjust a moisture content within the range of 12–18%, molding the treated material by a pellet mill and treating the pellets in a high pressure vessel at a gauge pressure of at least 1.0 kg/cm$^2$ for at least 2 minutes or a process which includes extrusion-molding the material (A) at a temperature of at least 110° C. by means of an extruder.

The gluten as treated in this manner is completely deactivated, causes loss of stickiness and undergoes a sufficient thermal denaturation of protein. Then the treated gluten is suitably ground, charged with added water so as to give a charging moisture content of 35–50% and used for further koji-making, which gives no difficulty in any work. Due to swell characteristics of gluten, the treated gluten has a superior depositability and is very suitable for aeration koji-making. The treated gluten, when blended with heat-treated soybeans, exhibits a similar superior koji-making effect. The koji product thus prepared has higher protease and glutaminase activities as a proportion of the gluten used is increased.

The soybeans used in the present invention include defatted soybean, whole soybean, crushed soybean and the like, which are charged with added water or soaked in water, and subsequently steamed, or subjected to extrusion-molding at a temperature of at least 110° C. together with gluten or wheat, thereby to denature protein therein sufficiently.

It is extremely important for achieving the object of this invention that the blending proportion of gluten with wheat should be 25–100% of gluten and 75-0% of wheat on a dry basis based on the weight of both materials and the blending proportion of soybeans should be 10–30% on a dry basis based on the total weight of all raw materials.

In the present invention, the use of gluten is essential, but wheat is optional. When wheat is used, it is required that not greater than 75% of wheat should be used and not less than 25% of gluten should be blended. If less than 25% of gluten is used, the resultant seasoning liquor has a light color, but taste tends to be insufficient and the object of this invention cannot be accomplished.

In blending soybeans, 10–30% of soybean are required to incorporate in all raw materials used, i.e. a blend material composed of gluten and soybean or a blend material composed of gluten, wheat and soybean. If greater than 30% of soybean is blended, the resultant seasoning liquor has a good taste, but has a redness-enhanced color derived from soybean and poor flavor with a browning rate being accelerated. When less than 10% of soybean is blended, the seasoning liquor has a light color, but has unsatisfactory taste and the object of this invention cannot be accomplished.

In preparing a seasoning liquor by the present process, the koji product prepared by koji-making using the above blend material of the present invention is charged with water or an aqueous solution of common salt in a conventional manner, subjectd to a usual control of moromi prodcution at 10°–60° C. for 3 days to 5 months for fermentation and maturing, and filtered or squeezed to produce the seasoning liquor. The seasoning liquor thus obtained is like a soy sauce, has a light color, a slow browning rate, a very good taste and an excellent flavor.

This invention is further illustrated by the following examples.

Example 1

Steam was added directly to 1800 g of vital gluten powder which was then molded at a moisture content of 12.1% to cylindrical pellets each having a diameter of 4 mm by means of a pellet mill. The pellets were steamed in a high pressure vessel with a saturated steam at a gauge pressure of 2 kg/cm$^2$ for 3 minutes and then ground to obtain a ground product. Separately, 240 ml of water was added to 200 g of defatted soybean which was then treated in a high pressure vessel with a saturated steam at a gauge pressure of 1.0 kg/cm$^2$ for 10 minutes to obtain a steamed soybean. The steamed soybean was blended with the ground product obtained as above, water was added to give a moisture content of 45%, a seed koji was inoculated and koji-making was continued at 25°–35° C. for 43 hours to obtain a koji product. The koji product was charged with 3600 ml of a 23% aqueous solution of common salt, fermented at 15°–30° C. for 4 months and squeezed to obtain an unpasteurized seasoning liquor. The seasoning liquor was adjusted with an aqueous solution of common salt to a total nitrogen (TN) of 1.2% and pasteurized at 60° C. for 3 hours.

The seasoning liquor thus prepared had a very light color, a slow browning rate, a very good taste and an excellent flavor.

Example 2

Steam was added directly to a mixture of 350 g of vital gluten powder and 1050 g of wheat flour and the mixture was molded at a moisture content of 17.5% to cylindrical pellets each having a diameter of 4 mm by means of a pellet mill, steamed in a high pressure vessel with a saturated steam at a gauge pressure of 1.5 kg/cm$^2$ for 10 minutes and ground to obtain a ground product. Separately, 720 ml of water was added to 600 g of defatted soybean which was then treated in a high pressure vessel with a saturated steam at a gauge pressure of 1.5 kg/cm$^2$ for 10 minutes to obtain a steamed soybean. The steamed soybean was blended with the ground product obtained as above, water was added to give a moisture content of 45%, a seed koji was inoculated and koji-making was continued at 25°–35° C. for 43 hours to obtain a koji product. The koji product was charged with 3400 ml of a 23% aqueous solution of common salt, fermented at 15°–30° C. for 4 months and squeezed to obtain an unpasteurized seasoning liquor. The seasoning liquor was adjusted with an aqueous solution of common salt to a total nitrogen (TN) of 1.2% and pasteurized at 60° C. for 3 hours.

The seasoning liquor thus prepared had a light color, a very good taste and an excellent flavor.

Example 3

To a mixture of 5000 g of vital gluten powder and 1500 g of wheat whole grain was added steam directly and the mixture was molded at a moisture content of 13.5% to cylindrical pellets each having a diameter of 4 mm by means of a pellet mill, the pellets were steamed in a high pressure vessel with a saturated steam at a gauge pressure of 1.0 kg/cm$^2$ for 10 minutes and ground to obtain a ground product. Separately, 360 ml of water was added to 300 g of defatted soybean which was then steamed in a high pressure vessel with a saturated steam at a gauge pressure of 2.0 kg/cm$^2$ for 5 minutes to obtain a steamed soybean. The steamed soy bean was blended with the ground product obtained as above, and water was added to give a moisture content of 50%. After a seed koji was inoculated, koji-making was continued at 25°–35° C. for 43 hours to obtain a koji product. The koji product was charged with 3800 ml of a 23% aqueous solution of common salt, fermented at 30° C. for one month and squeezed to give an unpasteurized seasoning liquor. This seasoning liquor was adjusted to a total nitrogen (TN) of 1.2% with an aqueous solution of common salt and pasteurized at 60° C. for 3 hours. The seasoning liquor thus prepared had a light color, a slow browning rate, a very good taste and an excellent flavor.

Example 4

1280 g of vital gluten and 320 g of wheat flour were mixed with 400 g of soybean, the mixture was placed into a twin-screw type extruder (C 37, manufactured by Werner & Pfleiderer Co.,Ltd.) and then extrusion-molded at an added water content of 20% at 120° C. and dried. The product was coarsely ground to a particle diameter of 0.2–3 mm and water was then added so as to give a moisture content of 45%. After a seed koji was inoculated, koji-making was continued at 25°–35° C. for 43 hours to obtain a koji product. The koji product was charged with 3400 ml of a 23% aqueous solution of common salt, fermented at 15°–30° C. for 4 months and squeezed to give an unpasteurized seasoning liquor. This seasoning liquor was adjusted to a total nitrogen (TN) of 1.2% with an aqueous solution of common salt and pasteurized at 60° C. for 3 hours.

The seasoning liquor thus prepared had a light color, a slow browning rate, and a very good taste and an excellent flavor.

Example 5

To a mixture of 800 g of dry gluten and 800 g of wheat flour was added steam directly and the mixture was molded at a moisture content of 16.3% to cylindrical pellets each having a diameter of 4 mm by means of a pellet mill. The pellets were steamed in a high pressure vessel with a saturated steam at a gauge pressure of 1.8 kg/cm$^2$ for 5 minutes and then ground to give a ground product. Separately, 480 ml of water was added to 400 g of defatted soybean which was then steamed in a high pressure vessel with a saturated steam at a gauge pressure of 2.0 kg/cm$^2$ for 5 minutes to give a steamed soybean. The steamed soybean was blended with the ground product obtained as above, and water was added to give a moisture content of 40%. After a seed koji was inoculated, koji-making was continued at 25°–35° C. for 43 hours to obtain a koji product. The koji product was charged with 3300 ml of a 23% aqueous solution of common salt, fermented at 15°–30° C. for 4 months and squeezed to obtain an unpasteurized seasoning liquor. The seasoning liquor was adjusted to a total nitrogen (TN) of 1.2% with an aqueous solution of common salt and pasteurized at 60° C. for 3 hours. The seasoning liquor thus prepared had a light color, a very good taste and an excellent flavor.

Comparative Example 1

To 1000 g of wheat whole grain was added steam directly, the powder was molded at a moisture content of 12.1% to cylindrical pellets each having a diameter of 4 mm by means of a pellet mill and the pellets were steamed in a high pressure vessel with a saturated steam at a gauge pressure of 2.0 kg/cm$^2$ and then ground to give a ground product. Separately, 1200 ml of water was added to 1000 g of soybean which was then treated in a high pressure vessel with a saturated steam at a gauge pressure of 1.8 kg/cm$^2$ for 5 minutes to give a steamed soybean. The steamed soybean was blended with the ground product obtained as above, and water was added to give a moisture content of 45%. After a seed koji was inoculated, koji-making was continued at 25°–35° C. for 43 hours to give a koji product. The koji product was charged with 4000 ml of a 23% aqueous solution of common salt, fermented at 15°–30° C. for 4 months, squeezed to give an unpasteurized seasoning liquor. The seasoning liquor thus prepared was adjusted to a total nitrogen (TN) of 1.2% with an aqueous solution of common salt and pasteurized at 60° C. for 3 hours.

The seasoning liquor thus prepared had a somewhat deep color, a less taste and a poor flavor.

Test Example 1

The unpasteurized seasoning liquors prepared in Examples 1–5 and Comparative Example 1 were determined for a total nitrogen (TN) content and an amount of glutamic acid per total nitrogen (Glu/TN), while the seasoning liquor products were determined for JAS Color Number and browning rate. The results are shown in Table 1.

In this Example, the browning rate is shown in terms of the value (ΔOD) obtained by subtracting the OD value prior to pasteurization (at a wavelength of 530 nm) from the OD value measured by a spectrophotometer (manufactured by Hitachi Ltd.) at a wavelength of 530 nm when the seasoning liquor product was further heated at 85° C. for 4 hours. Lower ΔOD value indicates slower browning rate. The ΔOD value of not more than 0.1 is preferable. The ΔOD value was determined using a cell with a liquid layer of 10 mm after diluting the seasoning liquor product to ten times in volume.

TABLE 1

| | Seasoning liquor before pasteurization | | Seasoning liquor | Browning |
|---|---|---|---|---|
| | TN (%) | Glu/TN (mg/g) | JAS Color Number | rate (ΔOD) |
| Example 1 | 2.55 | 1410 | 47 | 0.035 |
| Example 2 | 1.83 | 803 | 38 | 0.088 |
| Example 3 | 1.89 | 820 | 42 | 0.065 |
| Example 4 | 2.43 | 1150 | 45 | 0.051 |

TABLE 1-continued

| | Seasoning liquor before pasteurization | | Seasoning liquor | Browning |
|---|---|---|---|---|
| | TN (%) | Glu/TN (mg/g) | JAS Color Number | rate (ΔOD) |
| Example 5 | 2.13 | 930 | 43 | 0.075 |
| Comparative Example 1 | 1.71 | 720 | 30 | 0.125 |

Test Example 2

Following the procedure described in Example 2, each raw material of the blend material shown in Table 2 was thermally treated to give a steamed soybean. The steamed soybean was blended with the thermally treated gluten and/or the thermally treated wheat flour, and water was added to the mixture so as to give a charging moisture content of 42.5%. After a seed koji was added and mixed, koji-making was continued at 25°–35° C. for 43 hours to give a koji product. Each koji product thus obtained was charged with 2000 ml of a 23% aqueous solution of common salt, fermented at 15°–25° C. for 4 months and squeezed to obtain an unpasteurized seasoning liquor. The seasoning liquor was determined for a total nitrogen (TN) content and a glutamic acid content per total nitrogen (Glu/TN) and the results are shown in Table 2. Further, each seasoning liquor was adjusted to a common salt concentration of 17% and a total nitrogen (TN) of 1.2% and pasteurized at 60° C. for 3 hours. The seasoning liquor was determined for JAS Color Number and browning rate. As a color becomes light, a larger Color Number is assigned. The results are shown in Table 2.

Organoleptic test (taste, flavor) was conducted for the seasoning liquors. In the organoleptic test, the taste and flavor of each of the seasoning liquors in lots Nos. 1–18 and 20–24 were compared with those of the liquor in lot No. 19 as a control. The results were rated on the following scores:

0: no difference

1: some difference

2: large difference

3: very large difference

Where the tested seasoning liquors are superior to the control (lot No. 19), the sign "+" is attached. Where they are inferior to the control, the sign "−" is attached. These ratings are average of the results obtained by a panel of 20 persons for organoleptic test.

In the column of "overall evaluation", each sign shows the following:

X: Not accepted

○: Accepted (accepted products of TN≧1.67, Glu/TN>720, JAS Color No.≧35, ΔOD≦0.1 and average ratings in organoleptic evaluation >0)

⊚: Particularly superior in accepted products

TABLE 2

| No. | Blend material (g) Defatted soybean | Wheat gluten (a) | Wheat flour (b) | $\frac{a}{a+b} \times 100\,(\%)$ | Component value (Seasoning liquor before pasteurization) TN (%) | Glu/TN (mg/g) | Color (Seasoning liquor) JAS color No. | Browning rate ($\Delta$OD) | Organoleptic evaluation Taste | Flavor | Overall evaluation |
|---|---|---|---|---|---|---|---|---|---|---|---|
| 1  | 50  | 0   | 950 | 0   | 1.372 | 548  | 39 | 0.112 | −2.5 | −1.8 | X |
| 2  | 50  | 95  | 855 | 10  | 1.507 | 619  | 40 | 0.105 | −2.0 | −1.6 | X |
| 3  | 50  | 238 | 712 | 25  | 1.709 | 726  | 42 | 0.089 | +0.5 | −1.4 | X |
| 4  | 50  | 380 | 570 | 40  | 1.911 | 833  | 45 | 0.084 | +1.5 | −1.1 | X |
| 5  | 50  | 570 | 380 | 60  | 2.310 | 975  | 46 | 0.070 | +2.5 | −0.8 | X |
| 6  | 50  | 950 | 0   | 100 | 2.721 | 1260 | 48 | 0.042 | +3.0 | −0.5 | X |
| 7  | 100 | 0   | 900 | 0   | 1.414 | 570  | 38 | 0.110 | −1.8 | −0.8 | X |
| 8  | 100 | 90  | 810 | 10  | 1.542 | 638  | 39 | 0.103 | −0.8 | +0.2 | X |
| 9  | 100 | 225 | 675 | 25  | 1.810 | 739  | 41 | 0.088 | +0.7 | +1.2 | ○ |
| 10 | 100 | 360 | 540 | 41  | 1.925 | 840  | 43 | 0.083 | +1.7 | +1.5 | ○ |
| 11 | 100 | 540 | 360 | 60  | 2.275 | 1010 | 45 | 0.070 | +2.4 | +1.8 | ○ |
| 12 | 100 | 900 | 0   | 100 | 2.692 | 1245 | 47 | 0.043 | +2.8 | +2.4 | ◎ |
| 13 | 0   | 0   | 700 | 0   | 1.585 | 660  | 34 | 0.101 | −1.2 | +0.2 | X |
| 14 | 300 | 70  | 630 | 10  | 1.684 | 713  | 35 | 0.096 | −0.3 | +0.4 | X |
| 15 | 300 | 175 | 525 | 25  | 1.833 | 791  | 37 | 0.089 | +0.8 | +0.8 | ○ |
| 16 | 300 | 210 | 490 | 40  | 1.883 | 818  | 39 | 0.085 | +1.6 | +1.2 | ○ |
| 17 | 300 | 420 | 280 | 60  | 2.181 | 975  | 40 | 0.070 | +2.2 | +1.5 | ○ |
| 18 | 300 | 700 | 0   | 100 | 2.579 | 1185 | 42 | 0.049 | +2.7 | +2.0 | ◎ |
| 19 | 400 | 0   | 600 | 0   | 1.670 | 720  | 32 | 0.101 | 0.0  | 0.0  | X |
| 20 | 400 | 60  | 540 | 10  | 1.755 | 750  | 32 | 0.092 | +0.6 | +0.1 | X |
| 21 | 400 | 150 | 450 | 25  | 1.883 | 818  | 33 | 0.091 | +1.0 | +0.2 | X |
| 22 | 400 | 240 | 360 | 40  | 2.011 | 885  | 33 | 0.086 | +1.7 | +0.3 | X |
| 23 | 400 | 360 | 240 | 60  | 2.181 | 975  | 34 | 0.083 | +2.1 | +0.4 | X |
| 24 | 400 | 600 | 0   | 100 | 2.522 | 1155 | 34 | 0.080 | +2.5 | +0.4 | X |

It can be seen from the results in Table 2 that, if a weight proportion of soybean in a total weight of the materials employed is set not more than 30% and a weight proportion of gluten in a total weight of wheat and gluten is set not less than 25%, there can be produced a seasoning liquor having a light color, a slow browning rate, a very good taste and an extremely superior flavor not so far available.

According to this invention, there can be manufactured a seasoning liquor having a very light color (No. 35 or more of JAS Color Number) with a slow browning rate, a stable luster and color, a very good taste and an excellent flavor.

What is claimed is:

1. A process for the production of a light-colored seasoning liquor, which comprises the steps of:

forming a koji-making material comprising a blend material of (A) 90-70% by weight of a material consisting of 25-100% by weight of gluten and 75-0% by weight of wheat and (B) 10-30% by weight of soybeans, all percentages by weight being on a dry basis;

adding a seed koji to the koji-making material to obtain a koji product;

adding to the koji product an aqueous solution of common salt to form a salt-containing koji product;

fermenting the salt-containing koji product; and then squeezing the fermented koji product to obtain a light-colored seasoning liquor.

2. The process of claim 1 wherein the blend material is (A) 90-70% by weight of gluten and (B) 10-30% by weight of soybeans.

3. The process of claim 1 wherein part (A) of the blend material is a mixture of gluten and wheat.

4. The process of claim 1 wherein the gluten is a wet gluten or a dried gluten.

5. The process of claim 4 wherein the dried gluten is vital gluten powder or dry gluten.

6. The process of claim 4, where the gluten is wheat gluten or corn gluten.

7. The process of claim 1 wherein the wheat is wheat grain, wheat flour or milled wheat grain from which bran coat is removed.

8. The process of claim 1 wherein the soybeans are defatted soybeans, whole soybeans or crushed soybeans.

* * * * *